July 10, 1928.
J. R. HUNTER
1,676,829
TAPERED PLUG FOR CIRCULAR MANDRELS
Filed Oct. 29, 1926
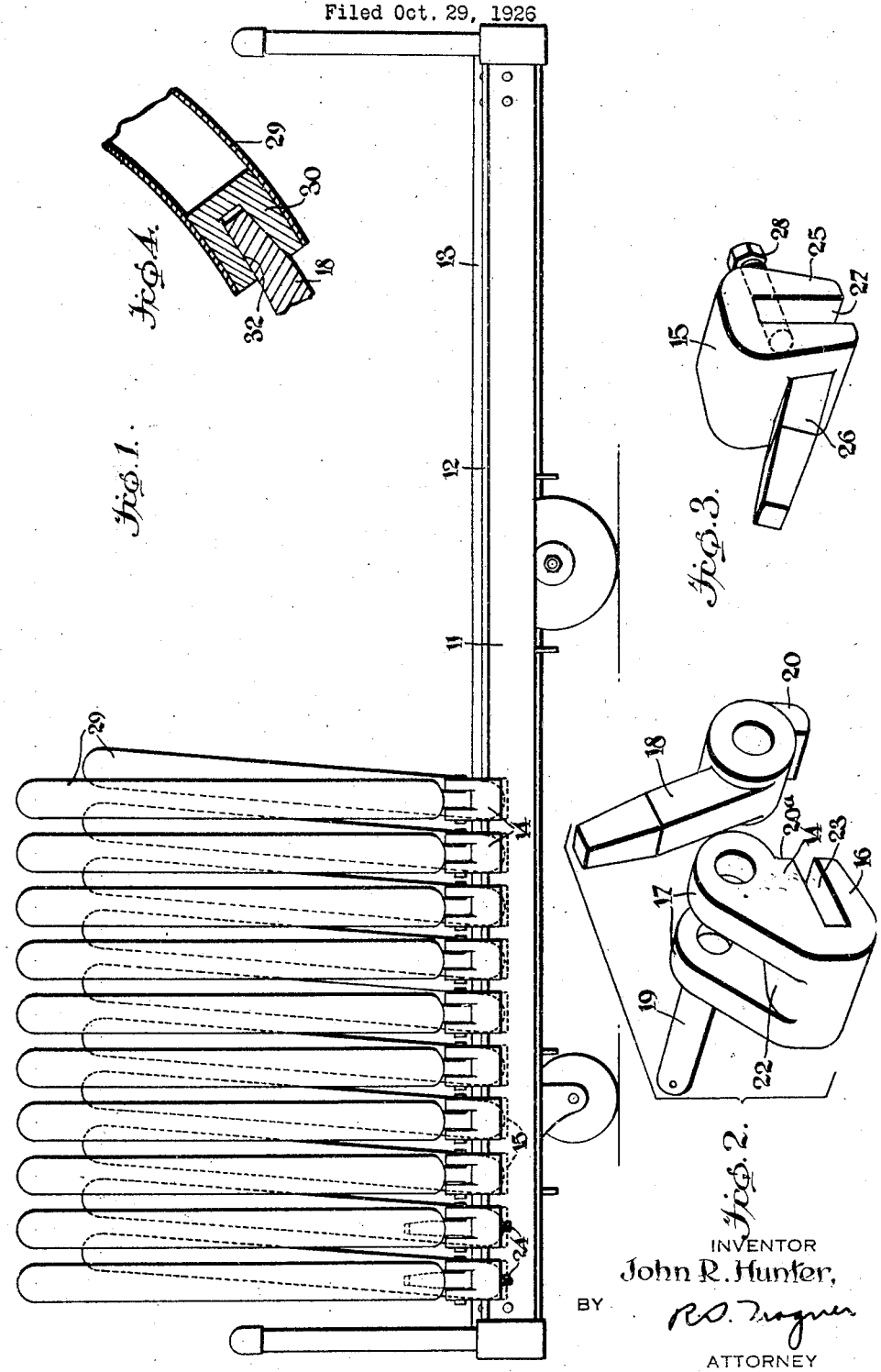
INVENTOR
John R. Hunter,
BY
ATTORNEY Patented July 10, 1928.

1,676,829

UNITED STATES PATENT OFFICE.

JOHN R. HUNTER, OF AKRON, OHIO, ASSIGNOR TO THE GOODYEAR TIRE & RUBBER COMPANY, OF AKRON, OHIO, A CORPORATION OF OHIO.

TAPERED PLUG FOR CIRCULAR MANDRELS.

Application filed October 29, 1926. Serial No. 144,961.

My invention relates to apparatus employed in the manufacture of inner tubes for pneumatic tire casings, and it has particular reference to a vulcanizing apparatus upon which inner tubes are cured upon curved mandrels or cores.

One object of my invention is to provide a vulcanizing apparatus so designed that a material increase in the production of inner tubes may be effected without increasing the size of the conventional heaters ordinarily employed incidentally to vulcanizing such inner tubes.

One of the known methods of vulcanization employed in the manufacture of inner tubes consists in wrapping sheets or strips of rubber compound on curved or arcuate mandrels or cores and mounting the cores upon a truck which is rolled into a cylindrical oven where the rubber is subjected to vulcanizing heat.

In order to obtain greater production capacity for the apparatus, mandrels of different radii of curvature have been employed and arranged in concentric rows upon the carriage. An apparatus embodying these features is fully described and claimed in the co-pending application of Russell W. Hainer, for curved tube vulcanizing apparatus filed July 13, 1926, Serial No. 122,116, now patent #1,658,894.

The supporting means heretofore employed for holding the mandrels in an upright position permitted them to tilt slightly to one side or to the other and it was therefore necessary to place them a considerable distance apart in the rows in order to prevent the tubes from touching each other during vulcanization thereof, thereby causing a defective product.

The principal feature of my invention is an improvement of the supporting means employed in apparatus of this character in order that the mandrels may be held firmly in proper position, thereby avoiding the possibility of the tubes touching each other when the mandrels are placed close together in the rows.

For a better understanding of my invention reference may now be had to the accompanying drawings forming a part of this specification, of which:

Fig. 1 is a side elevational view of an apparatus for conveying tubes into a heater illustrating a number of mandrels mounted thereon;

Fig. 2 is an exploded perspective view of one of the forms which my invention may assume;

Fig. 3 is a perspective view of another form thereof; and,

Fig. 4 is a cross-sectional view showing the supporting means in position within a mandrel.

In practicing my invention, I employ a truck or carriage 11 which is adapted to run on a track into a heater (not shown). Since these elements are of well known construction, it is not believed to be necessary to describe them in detail.

A horizontally disposed clamping rail 12 is provided on one side of the truck and extends throughout its length. This clamping rail is in the form of a long plate rectangular in cross section and one edge of the plate is secured to the truck while the opposite edge is free.

In the center of the truck is another clamping rail 13 which is similar to the one just described with the exception that it is held in a vertical position and is secured to the truck at its lower edge.

A plurality of supporting members 14 shown in Fig. 2 are adapted to engage the horizontal clamping rail 12, while a similarly disposed plurality of supporting members 15, shown in Fig. 3, are adapted to engage the vertical clamping rail 13.

Each supporting member 14 comprises a clamping portion 16, two bearing ears 17, and a plug 18, which is pivotally supported thereon by means of a pin 19. The plug 18, as shown, is tapered toward its outer end and is rectangular in cross section, but it may be of any other practical cross-sectional design. In order to limit the pivotal movement of the plug 18 about the pin 19 in one direction, a lug 20 is formed thereon which is adapted to engage an edge portion 20ª of the supporting member. Also the shank of the plug is adapted to engage a surface portion 22 between the ears 17 to limit pivotal movement thereof in the other direction. The supporting member 14 is provided with a recess 23 which fits over the edge portion of the rail 12, and a set screw 24 clamps the support to the rail.

Each supporting member 15 comprises a clamping portion 25 and a plug 26, which differs from the plug 18 only in its connections and in the angle at which it projects from the clamping portion. A recess 27 formed in the clamping portion 25 fits over the edge portion of the rail 13 and a set screw 28 is provided for clamping the supporting member thereto.

The supporting members 14 and 15 are adapted to receive mandrels 29 that are usually formed of curved tubing, and a plug 30 is rigidly secured within one end of each mandrel in any convenient manner. This plug 30 contains an opening 32 which is complementary to and is adapted to receive the tapered plugs 18 and 26 in wedged relation, thus providing a stable mounting which prevents the mandrels from tilting or wobbling.

In loading a truck with mandrels, the supporting members 14 are first arranged closely together on the clamping rail 12 and each plug is so positioned that it will rest upon the surface 22 and will extend approximately horizontally away from the carriage. The supporting members 15 are similarly placed upon the clamping rail 13 with the plugs 26 projecting upwardly at an incline. The smaller mandrels 29 are then mounted upon the tapered plugs 26 and the larger mandrels 29 thereafter being mounted upon the tapered plugs 18. The mandrels of the outer row are then pivotally moved about the pin 19 into a position over and substantially concentrically with the mandrels of the inner row.

From the foregoing description it will be apparent that the mandrels supported upon the tapered plugs 18 and 26 will be held in a fixed position, and may therefore be placed very close together without danger of the tubes touching each other.

Although I have illustrated but one form which my invention may assume and have described in detail but a single application thereof, it will be apparent to those skilled in the art that it is not so limited but that various minor modifications and changes may be made therein without departing from the spirit of the invention or from the scope of the appended claims.

What I claim is:

1. The combination with a curved mandrel having a tapered opening in one end thereof, of a supporting member having a tapered plug pivoted thereto for engaging the tapered opening, and means for limiting pivotal movement of the plug in two directions.

2. The combination with a mandrel having a tapered opening therein, of a tapered plug for the opening, a supporting rail for the plug and means for clamping the latter upon the rail.

3. The combination with a mandrel having a tapered opening therein, of a tapered plug for the opening having a transversely extending recess formed at one end thereof and a rail for supporting the plug adapted to extend within the recess.

4. The combination with a tube forming mandrel, of a supporting member therefor, the mandrel and the supporting member being provided with tapered complementary interfitting portions, and a supporting rail for the member, the rail and the member also being provided with complementary interfitting portions.

5. The combination with a mandrel having a non-circular tapered opening in one end thereof, of a complementary plug for the opening, a recessed member for supporting the plug having pivotal connection therewith and a rail associated operatively with the recess in the member.

6. The combination of a plurality of arcuate mandrels, each having a non-circular tapered opening in one end thereof, of a plurality of plugs complementary to the openings and a rail for supporting the plugs in fixed relation to each other.

In witness whereof, I have hereunto signed my name.

JOHN R. HUNTER